May 22, 1962

H. E. HOLLMANN 3,035,449

ACCELEROMETER

Filed Aug. 25, 1958

HANS E. HOLLMANN
INVENTOR.

BY
ATTORNEY

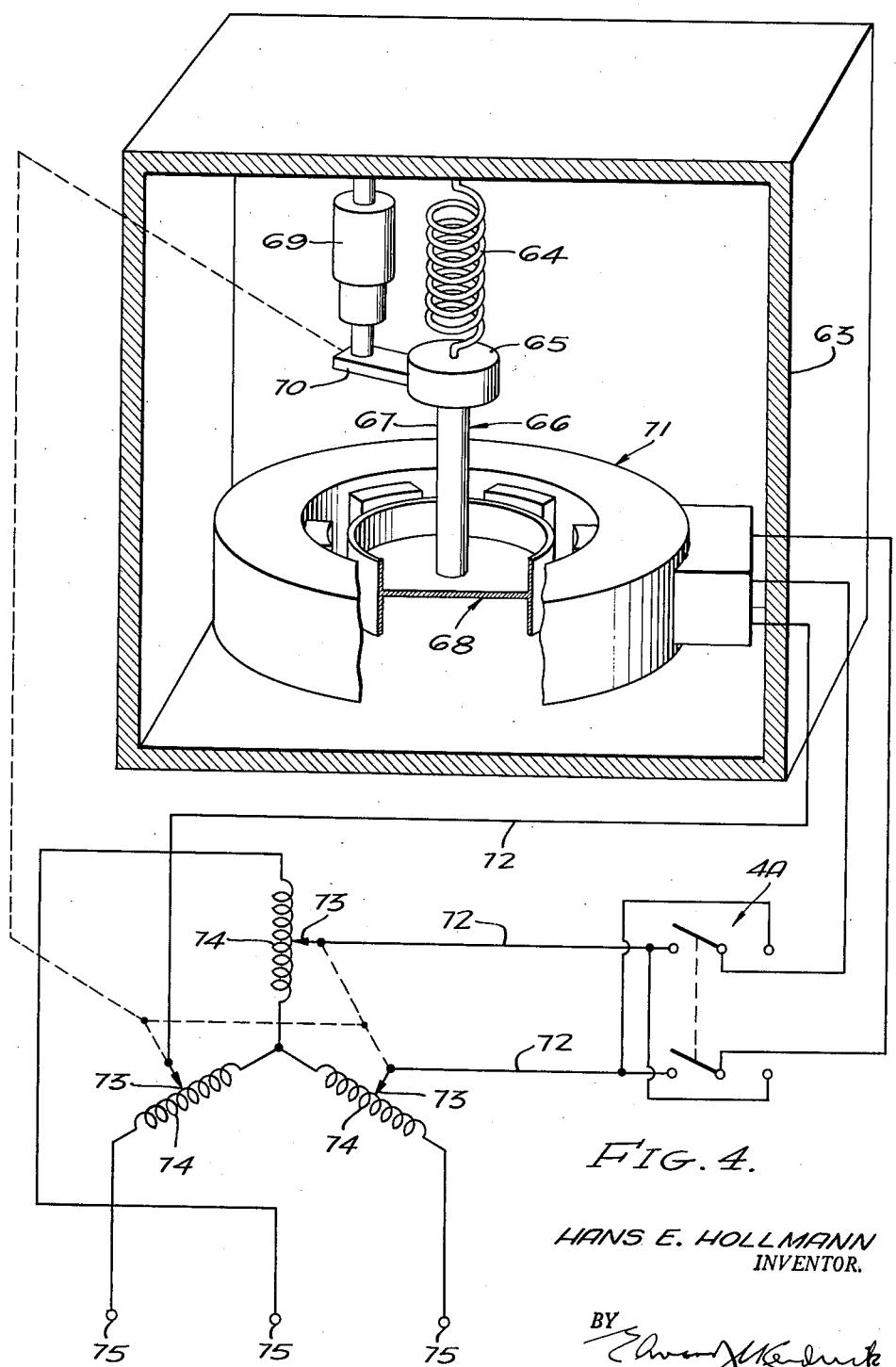

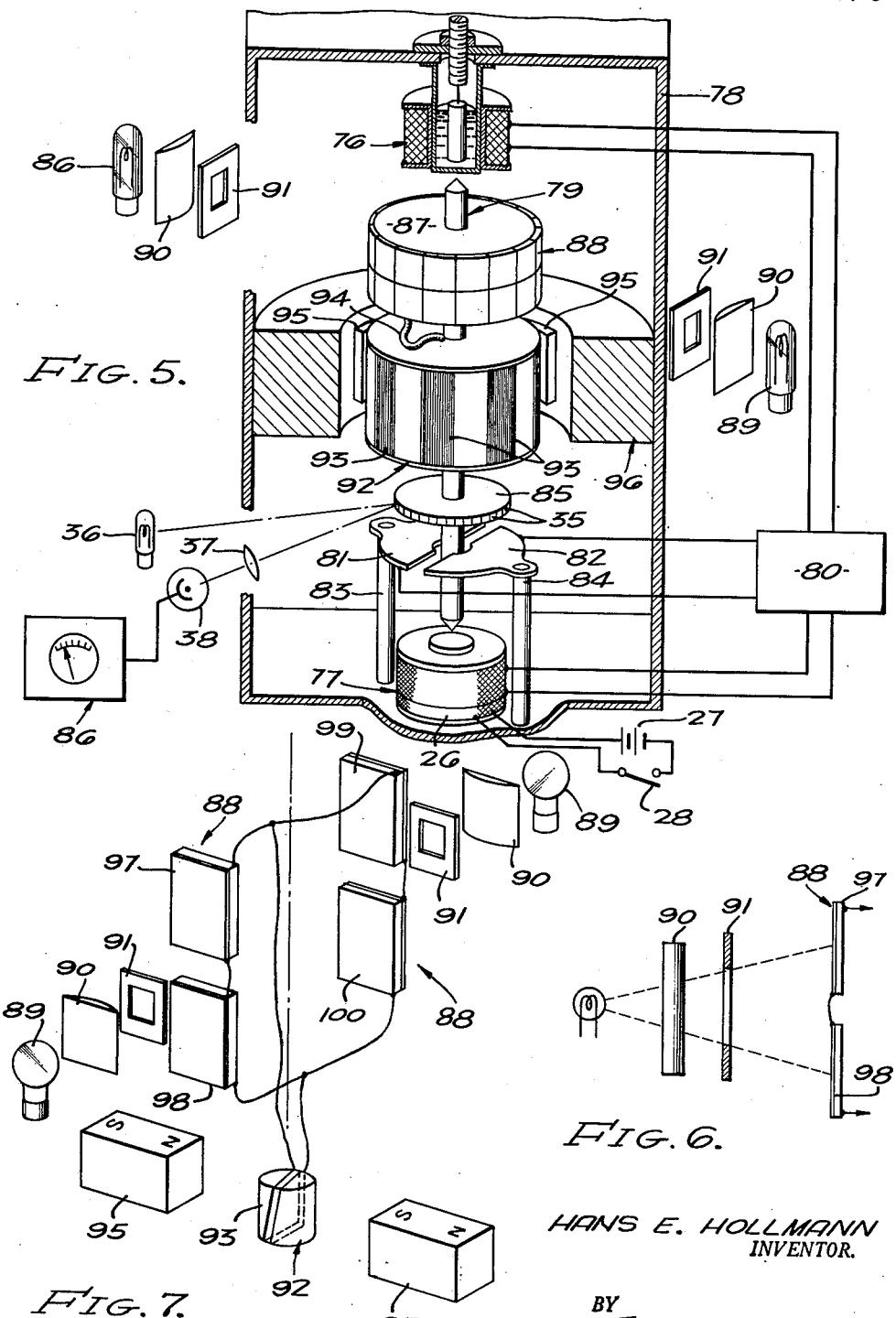

May 22, 1962  H. E. HOLLMANN  3,035,449
ACCELEROMETER
Filed Aug. 25, 1958  4 Sheets-Sheet 4
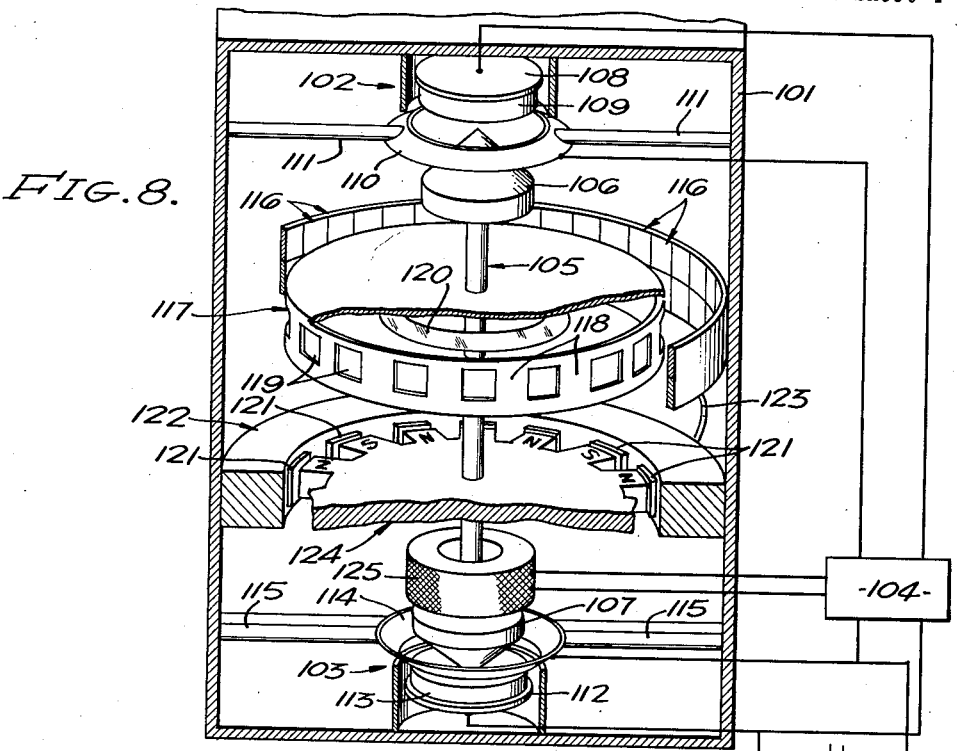
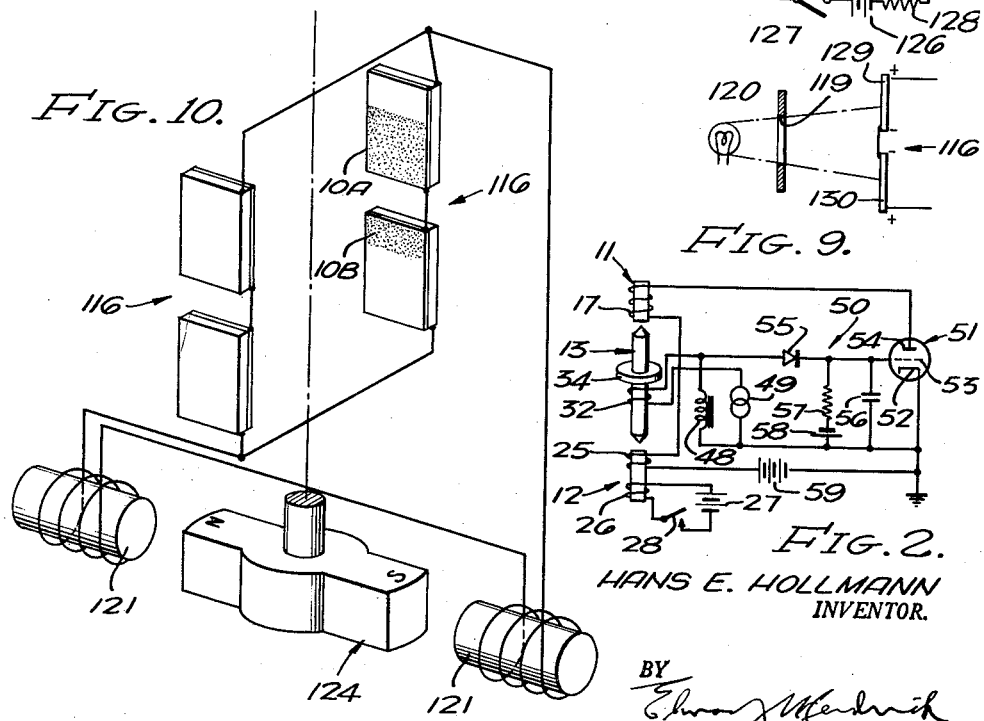
HANS E. HOLLMANN
INVENTOR.
BY
ATTORNEY United States Patent Office
3,035,449
Patented May 22, 1962

3,035,449
ACCELEROMETER
Hans E. Hollmann, Studio City, Calif., assignor to Dresser Industries, Inc., Dallas, Tex., a corporation of Delaware
Filed Aug. 25, 1958, Ser. No. 757,045
15 Claims. (Cl. 73—490)

This invention relates to devices for detecting the acceleration and velocity of vehicles moving rapidly through space, and more particularly to integrating accelerometers which automatically perform an integration of the acceleration signals which they derive within themselves.

Accelerometers generally comprise a "proof mass" which is biased by some means, such as a mechanical spring, to resist its movement yieldingly, whereby the displacement of the yielding means and proof mass produce an indication which is directly proportional to the acceleration of a vehicle to which the accelerometer is attached.

Accelerometers form the very heart of any inertial navigation system. However, when they are carried by a vehicle, they primarily produce only acceleration signals from which the velocity and position of the vehicle must be derived. This is performed, according to Newton's law of inertia, by an integration of the accelerometer's output signal with respect to time, such integration being usually performed by mechanical or electrical integrators or computers. Thus, a considerable amount of equipment must be employed in conjunction with a multiplicity of accelerometers in order to compute the position of the vehicle as it moves with increasing or decreasing speed through space. This means that computations are not only complicated, but also are inaccurate and unreliable due to a large number of equipment components which must necessarily be employed.

The present inveniton overcomes the above-described and other disadvantages of the prior art by providing a self-integrating accelerometer, more specifically a double-integrating device. By the use of very little additional equipment, conventional accelerometers may be employed to perform dual functions, viz., detecting components of acceleration and performing the necessary integrating functions. Hence, an accelerometer made according to the invention is less complicated, yet more sensitive and, therefore, more accurate and reliable than inertial position indicating systems of the prior art. The above-mentioned advantages are obtained through the use of the present invention including an accelerometer having a proof mass comprising the rotor of an electric motor. In accordance with the invention, the proof mass is suspended in space between two field-producing means. Means are also provided to exert torque upon the rotor in accordance with its axial displacement.

The field-producing means may be either magnetic or electric field-producing means and are used in place of both bearing supports for the electric motor rotor and in place of the yielding means or mechanical spring of conventional accelerometers. The ends of the rotor are thus made of a magnetic or dielectric material depending upon whether a magnetic or electric field is generated by the field-producing means. The rotor is suspended in a manner to move axially if the accelerometer of the invention is subjected to an accelerating force. The field-producing means must be provided with an electronic servo to restore the rotor to a predetermined initial axial position once the acceleration to which the rotor has been subjected decreases to zero.

The use of field-producing means is an outstanding feature of the invention because they obviate the necessity for bearings, the only resistance to motion being the atmosphere, if any, surrounding the rotor. This is an outstanding feature of the invention because it is bearing friction which affects the accuracy in the double integration function of the invention and "bearing friction," in the ordinary meaning of these words, is reduced to zero. Still further, in space vehicles where accelerometers are most widely used the atmosphere is very thin and hence the accuracy of the accelerometer of the invention as a double-integrating accelerometer is increased still further. Moreover, if further accuracy is required, the housing of the accelerometer of the invention may be evacuated.

Due to the fact that in accordance with the invention torque is exerted on the electric motor rotor proportional to its axial movement, its angular acceleration will be approximately proportional to the linear acceleration of the vehicle to which the accelerometer is attached in the direction of the rotor axis. If bearing friction were zero, the angular acceleration, velocity and displacement of the rotor would be directly proportional to the axial acceleration, velocity and displacement, respectively, of the vehicle to which the accelerometer is attached. "Bearing friction," as it is now known, is eliminated by the use of the invention. Friction due to the existence of the atmosphere around the rotor can be reduced by evacuating the accelerometer housing employed with the invention. However, friction due to the existence of atmosphere is proportional to rotor speed. Thus, if the rotor of the invention is rotated at rather low velocity, any error existing between the proportionality of vehicle linear acceleration, speed and displacement to rotor angular acceleration, speed and displacement, respectively, may be minimized for unusually great lengths of time and certainly for a sufficient length of time to be of use in guided missiles and the like.

Thus, the manner in which the accelerometer of the invention performs double-integration may be explained on the assumption that zero friction actually exists. The electric motor rotor of the accelerometer of the invention will then continue to turn at an angular velocity $\omega$ given by:

$$\omega = \int \alpha dt = \frac{1}{I} \int T dt$$

where $\alpha$ is angular acceleration;
$I$ is the moment of inertia of the movable mass about its rotational axis;
$T$ is torque applied to the rotor in proportion to its axial displacement; and
$t$ is time, because by Newton's second law of motion $$\alpha = \frac{T}{I}$$

The angular displacement, $\theta$, of the movable mass is given by $$\theta = \int \omega dt = \frac{1}{I} \int \int T dt^2$$

Hence, by measuring $\theta$ in a plane perpendicular to the axial direction of linear acceleration, $a$, of the movable mass, the double integration of T may be performed. By definition, T is proportional to acceleration, $a$, in accordance with the invention. Thus, the angular velocity, $\omega$, will always be proportional to the velocity of a vehicle in the direction of acceleration, $a$, to which the accelerometer of the invention is attached and angular displacement $\theta$ will always be proportional to the distance the vehicle has traveled in the direction of acceleration, $a$.

Due to the fact that the field-producing means provide substantially frictionless bearings, it is also an outstanding feature of the invention that a magnetically suspended rotor of an electric motor may be employed in either a double-integrating accelerometer or simply as an integrator. When the invention is employed as an integrator, the torque exerted on the rotor will simply be maintained proportional to the amplitude of an input signal to the integrator.

Along this same line, it is another feature of the invention that the rotor of the electric motor be isolated. That is, it does not physically contact any fixed structure. This is easily constructed with an induction motor. As is well known, the rotor of such a motor is driven by a rotating magnetic field. Such a rotating magnetic field may be provided by any of the so-called "single phase" motors wherein shaded poles, impedances to "split" the phase of a single phase driving source, or other devices that are used to develop a rotating magnetic field. Of course, conventional multiple phase induction motors may also be used to provide a rotating magnetic field.

As will be apparent, it is also possible to employ direct-current motors having a completely isolated rotor without a conventional commutator by employing photoelectric cells. Still further, if the rotor is only a permanent magnet, no commutator is necessary because vanes may be employed with fixed photoelectric cells to provide effectively a contactless and frictionless "commutation."

The invention will be better understood when considered in connection with the following description:

In the accompanying drawings, which are to be regarded as merely illustrative:

FIG. 2 is a schematic diagram of a control circuit shown in FIG. 1;

FIG. 4 is a perspective view of still another embodiment of the invention more simply illustrating especially the basic principles of the invention without showing the preferred form thereof;

FIG. 5 is a perspective view of still another embodiment of the invention;

FIG. 6 is a diagrammatic view of an illumination system as shown in FIG. 5;

FIG. 7 is a perspective view of apparatus illustrating the operation of the embodiment of the invention shown in FIG. 5;

FIG. 8 is a perspective view of still another embodiment of the invention;

FIG. 9 is a digrammatic view of an illumination system as shown in FIG. 8; and

FIG. 10 is a perspective view of apparatus illustrating the operation of the embodiment of the invention shown in FIG. 8.

Figure 1:
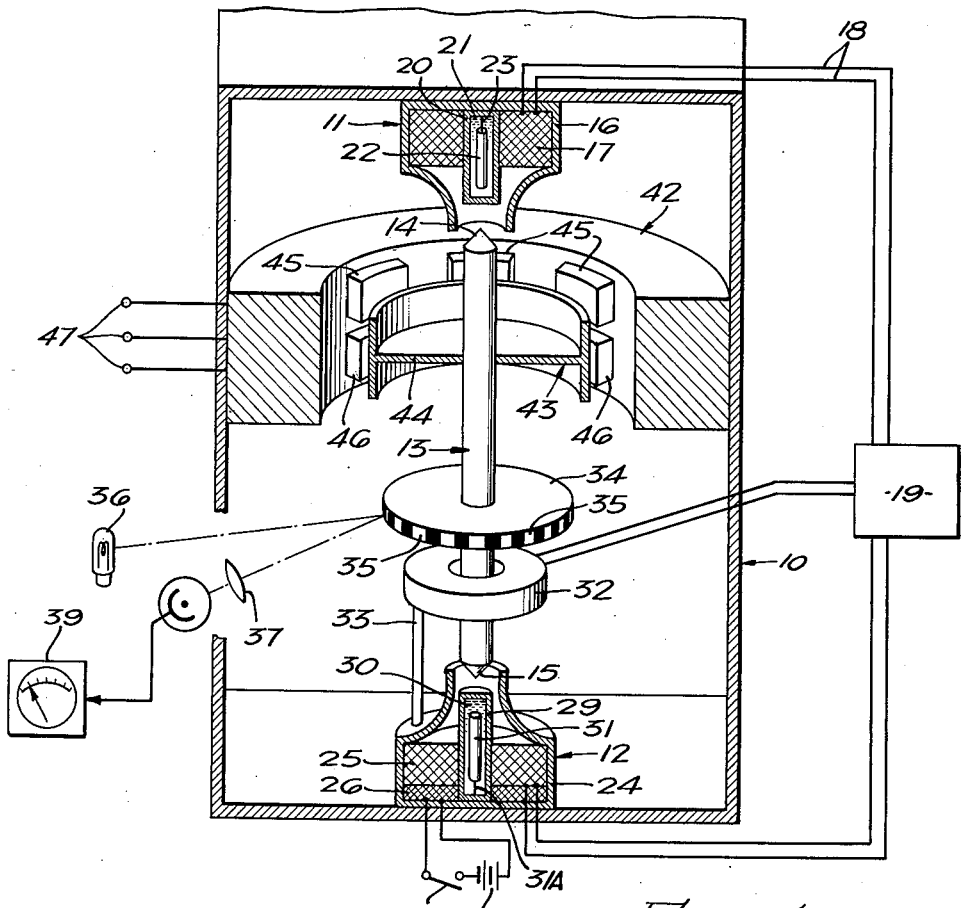
FIG. 1 is a perspective view of one embodiment of the invention.

In the drawing in FIG. 1, a housing 10 is shown for an accelerometer including upper and lower supporting electro-magnets 11 and 12 for a shaft 13 which preferably has upper and lower end armatures 14 and 15, respectively, of a conical shape and made of a ferromagnetic material.

Upper magnet 11 includes an enclosing ferromagnetic housing 16, a coil 17 having electrical leads 18 connected to a control circuit 19, and a non-magnetic internal cylinder 20 filled with a viscous liquid, such as oil 21, with a ferromagnetic rod 22 supported therein from a flexible support 23, such as a spring steel wire, to damp transverse vibrations of the upper end 14 of shaft 13.

Lower electromagnet 12 includes a ferromagnetic housing 24, a coil 25 connected to control circuit 19, a coil 26 connected to a battery 27 through a switch 28, non-magnetic cylinder 29 having oil 30 therein and a ferromagnetic rod 31 supported in a longitudinal position from a spring steel wire 31A. A detector coil 32 is disposed about shaft 13 in spaced relation therefrom and in a fixed position relative to housing 10 by means mounted on rods 33, only one being shown in the view of FIG. 1. Shaft 13 has a disc 34 fixed to it of a ferromagnetic material to increase the inductive reactance of coil 32 whenever shaft 13 moves downwardly. Disc 34 is also provided with black and white areas 35 around its circumference to reflect light provided by a lamp 36 through a lens 37 to a photocell 38. Photocell 38 converts flashes of light provided by areas 35 into electric voltage pulses which are counted by an electronic pulse counter 39.

In accordance with the invention, torque is imparted to shaft 13 proportional to its axial displacement due to acceleration of any vehicle to which housing 10 is attached. This is performed by means of an electric motor stator 42 and an electric motor rotor 43. Electric motor stator 42 is fixed to housing 10 and electric motor rotor 43 is fixed to shaft 13 by means of a conductive plate 44 made integral with rotor 43 which is simply a conductive cylinder. Electric motor stator 42 is not a conventional type but employs two sets of poles 45 and 46, the windings of which are not shown in FIG. 1. A three-phase voltage is preferably applied to the windings of sets of poles 45 and 46 at input terminals 47 in a manner such that both sets of poles 45 and 46 produce equal magnetic fields which rotate in opposite directions. The cylinder of rotor 43 is at least less in height than the distance from the top of poles 45 to the bottom of poles 46 as viewed in FIG. 1 and preferably is approximately equal in height to half of this distance and is symmetrically positioned by control circuit 19 through magnets 11 and 12 to be in this position normally when the vehicle to which the accelerometer housing 10 is attached is at rest. These two rotating magnetic fields can be provided in any convenient manner. Both sets of poles 45 and 46 may be simply wound in opposite directions and both supplied with the same input voltage at terminals 47.

Control circuit 19 may be very similar to that shown in FIG. 2 of an article entitled "Magnetic-Suspension Ultracentrifuge Circuits" by J. W. Beams, pp. 151 to 155 of Electronics, March 1954. However, even a more simple circuit may be used if desired. Such a circuit is shown in FIG. 2 of the drawings, where electromagnets 11 and 12 are indicated diagrammatically, electromagnet 12 including a coil 25 and a coil 26, coil 26 being energized by source 27 through switch 28. Also diagrammatically shown in FIG. 2 is shaft 13, disc 34, and pick-up coil 32.

Pick-up coil 32 is connected serially with an inductive winding 48 across which an alternating signal is impressed by means of a source 49. A rectifying, biasing and smoothing circuit 50 is then connected to a triode amplifier 51 having a cathode 52, a grid 53 and an anode 54. Circuit 50 includes a diode 55 connected from the junction of coils 32 and 48 to the grid 53 of triode 51. Connected between the grid 53 of triode amplifier 51 and ground is a capacitor 56 and a resistor 57 and battery 58 connected in parallel therewith. An anode supply is provided at 58 for triode amplifier 51. Battery 58 serves to bias amplifier 51 and as shaft 13 moves downwardly and the inductance of coil 32 thereby increases, the negative bias supplied by battery 58 will be partially overcome by the increase in current through diode 55. This means that triode 51 will conduct more heavily and shaft 13 will be drawn toward electromagnet 11 with a greater force. Similarly, and in accordance with a special feature of the invention, total magnetomotive force provided by source 27 through coil 26 always exceeds that supplied by the current through coil 25. However, when triode 51 conducts more heavily, the total force of attraction of electromagnet 12 to shaft 13 will be reduced. Hence, a "push-pull" action in terms of magnetomotive force at opposite ends of shaft 13 will be provided when it moves from a desired predetermined position to a different position. That is, as assumed, before, if shaft 13 moves downwardly toward electromagnet 12, an increased force of attraction will be provided at electromagnet 11 by triode 51 and a smaller force of attraction will be provided at electromagnet 11 by triode 51 to restore shaft 13 to its desired position. Conversely, if shaft 13 rises above a desired position too close to electromagnet 11, the current supplied by coil 32 through diode 55 to biasing circuit 50 will be reduced and the negative bias supplied by battery 58 will be increased. In this case, triode 51 will conduct less current and the force of attraction on shaft 13 due to current flow in the coil 17 of electromagnet 11 will be reduced. At the same time, the total force on the lower end of shaft 13 will be increased because current will be reduced in coil 25. Coil 26, although providing a constant magnetomotive force in bucking relation with coil 25, will increase the total force on the lower end of shaft 13, thus tending to pull shaft 13 downwardly and back to its desired position after it has moved toward electromagnet 11.

It is to be noted that the symmetry of the magnetic fields produced by electromagnets 11 and 12 will keep shaft 13 in a substantially stationary transverse position, the use of oil 21 and 30 in cylinders 20 and 29 with magnetic cores 22 and 31 providing transverse damping for movement of shaft 13 in a transverse direction.

Thus far, only an explanation of the operation of the supporting magnets 11 and 12 with control circuit 19 has been given. The operation of the embodiment of the invention shown in FIG. 1 as a self-integrating accelerometer is as follows.

When a constant three-phase alternating voltage is applied to leads 47 as shown in FIG. 1 and rotor 43 fixed to shaft 13 falls below its centered position between sets of poles 45 and 46, a greater voltage is induced therein by poles 46 which exert an unbalanced torque on shaft 13 proportional to its axial displacement. Shaft 13 will then rotate with an angular acceleration proportional to its axial displacement and will rotate at an angular velocity proportional to the velocity of the vehicle to which housing 10 is attached in the axial direction of shaft 13. The same thing will happen regardless of which direction shaft 13 moves axially; however, torque will be applied to shaft 13 in opposite angular directions depending upon which axial direction it moves in view of the fact that the magnetic fields produced by sets of poles 45 and 46 rotate in opposite directions, as stated previously.

As explained previously, since the angular acceleration of shaft 13 will be proportional to its displacement along its axis and therefore to the acceleration of a vehicle in the direction of the axis of shaft 13 to which housing 10 is attached, not only the angular velocity of shaft 13 will be proportional to the velocity of the vehicle in the direction of the axis of shaft 13 to which housing 10 is attached, but, also, the angular displacement of shaft 13 will be proportional to the linear distance the vehicle has traveled in the direction of the axis of shaft 13. This displacement may be conveniently measured by the use of lamp 36, black and white areas 35 on disc 34, lens 37, photocell 38, and pulse counter 39.

Figure 3:
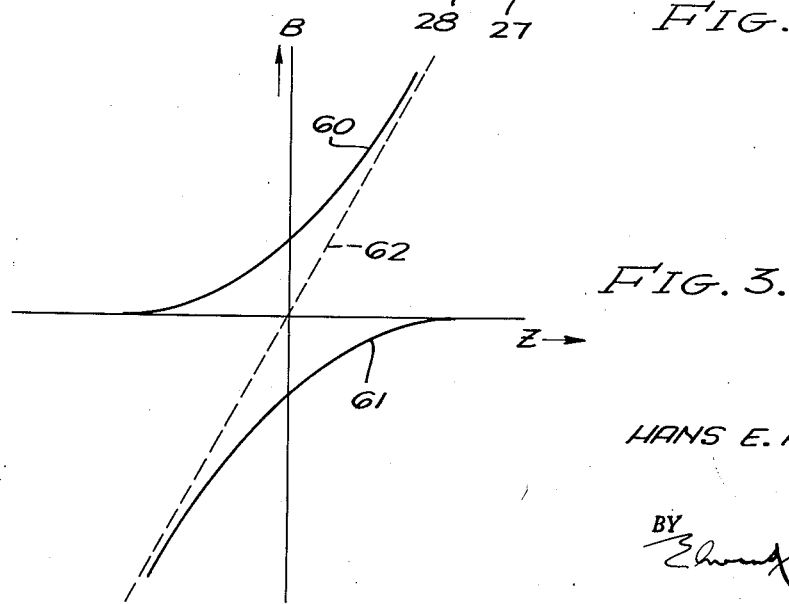
FIG. 3 is a magnetic field strength characteristic of an electric motor stator shown in FIG. 1.

To illustrate how, according to a special feature of the invention, the use of stator 42 imparts torque to shaft 13 proportional to the axial displacement of shaft 13 in a linear manner, average magnetic field strength of sets of poles 45 may be represented as a curve 60 in FIG. 3 as a function of axial distance z and average magnetic field strength produced by sets of poles 46 may be represented by the characteristic 61. Hence, the effective torque is equivalent to the difference between the two curves 60 and 61 according to the straight line 62. The differential torque imparted to shaft 13 will be directly proportional to axial displacement of shaft 13.

The accelerometer of FIG. 1 is an integrating accelerometer. The fact that air friction may resist rotation of shaft 13 only affects the measure of accuracy of the instrument. Thus, if the measuring system including photocell 38 and its associated component parts are made unusually accurate and areas 35 are made unusually small, the mass of shaft 13 may be increased substantially and the voltage applied at terminals 47 maintained at a relatively low value, whereby the speed of shaft 13 may be maintained at a relatively low value because, as is well known, the friction drag on shaft 13 will be proportional to its angular velocity. Thus, if shaft 13 always moves at a relatively low speed, practically no friction drag will cause shaft 13 to slow down in its angular movement. Still further, housing 10 may be evacuated and the double, integrating accuracy of the accelerometer may be improved still further, if desired, as stated previously.

As will be apparent, the embodiment of the invention shown in FIG. 1 will be much preferred over that shown in FIG. 4. However, the embodiment shown in FIG. 4 may better illustrate the principle of operation of the embodiment shown in FIG. 1. In FIG. 4, housing 63 is shown having a spring 64 suspended from its upper side and a low friction bearing 65 suspended from the lower end of the spring 64. A shaft 66 is also provided having a spindle 67 rotatably mounted in bearing 65 and a rotor 68 fixed to the lower end of spindle 67. A dash-pot 69 is connected between the upper side of housing 63 and a projection 70 which is fixed to the housing of bearing 65. Dash-pot 69 damps vertical oscillations of shaft 66. Rotor 68 is the rotor of an induction type electric motor having a stator 71 to cause rotation of rotor 68 proportional to three phase voltages applied to input leads 72. Voltages are impressed upon input leads 72 at movable taps 73 on three-phase autotransformers 74 that are supplied with three-phase voltages at terminals 75. Taps 73 are moved in response to movement of projection 70 fixed to the housing of bearing 65. Leads 72 are connected to the field windings of stator 71 and thus a rotating magnetic field is produced by stator 71 through rotor 68 of a magnitude proportional to the axial displacement of rotor 68. Thus, in the same manner as before, rotor 68 is rotated with an acceleration proportional to its axial displacement, with a velocity proportional to the speed of a vehicle to which housing 63 is fixed, and with a displacement proportional to the distance the vehicle moves. The angular acceleration, velocity and displacement of rotor 68 will then represent the linear acceleration, velocity and displacement of a vehicle to which housing 63 is attached in the axial direction of rotor 68. It is to be noted that a double-pole, double-throw switch 4A is provided to reverse the direction of torque applied to rotor 68 if linear deceleration takes place.

In the embodiment shown in FIG. 5, upper and lower electromagnets 76 and 77 are fixed to a housing 78 to support an electric motor shaft 79. Magnets 76 and 77 may be substantially identical to electromagnets 11 and 12 show nin FIG. 1. The same is true of a control circuit 80 shown in FIG. 5 to control the current flow through electromagnets 76 and 77 to support shaft 79 in a selected position. Circuit 80 may be identical with circuit 19 shown in FIG. 2 with the exception of inductive winding 48. A capacitor may be substituted for inductive winding 48 because two capacitive plates 81 and 82 fixed to housing 78 by means of dielectric rods 83 and 84 are connected in circuit 80 in place of coil 32 shown in FIG. 2. The capacitive coupling between plates 81 and 82 is varied by a metal disc 85 fixed to shaft 79. Disc 85 is still provided with black and white areas 35 to reflect light from lamp 36 through lens 37 to photoelectric cell 38 as before. Voltage pulses are produced by cell 38 and then registered by recording means generally indicated at 86. At least the upper and lower end armatures of shaft 79 are made of ferromagnetic material as in the case of shaft 13.

Shaft 79 has a pair of discs 87 fixed to it, upon which pairs of photoelectric cells 88 are mounted. The photoelectric cells of each pair 88 are connected in voltage bucking opposition. Illumination is provided for at least one pair of cells 88 at a time on opposite sides by means of lamps 89, lenses 90 and diaphragms 91.

Preferably, oppositely disposed pairs of photoelectric cells 88 are connected in parallel and to at least one winding turn on an electric motor rotor 92 having windings 93 connected to pairs of photocells 88 through conductors contained in a cable 94. Preferably, for each two oppositely disposed pairs of photocells 88, a pair of poles 95 is provided in electric motor stator 96. Poles 95 produce a substantially constant, unidirectional magnetic field and for this purpose may be either direct-current electromagnets or simply permanent magnets.

The structure and operation of the system for indicating rotation of shaft 79 including lamp 36, black and white areas 35, lens 37, photoelectric cell 38, and indicating means 86, is exactly the same as that of the rotation indicating arrangement shown in FIG. 1 including lamp 36, areas 35, lens 37, photoelectric cell 38 and pulse counter 39.

The operation of electromagnets 76 and 77 and control circuit 80 is substantially the same as the operation of electromagnets 11 and 12 and control circuit 19. When a capacitor, including plates 81 and 82, is substituted for inductive winding 32 and a second capacitor is substituted for inductive winding 48, as shown in FIG. 2, lowering of shaft 79 will cause amplifier 51 to conduct more heavily because the capacitance of plates 81 and 82 will be increased by movement of metal disc 85 towards plates 81 and 82. In the same manner as before, the field strength of electromagnet 76 will be increased at the same time as the magnetic field strength of electromagnet 77 is reduced. The same is true of movement of shaft 79 to a position above its selected position.

The manner in which torque is imparted to shaft 79 in proportion to its axial displacement will be better understood when considered in connection with FIGS. 6 and 7. In FIG. 6, one lamp 89, a lens 90, and a diaphragm 91 are shown in elevation in visual correspondence to a pair of photoelectric cells 88 including an upper cell 97 and a lower cell 98. It is to be noted that lamp 89, lens 90 and diaphragm 91 are located with respect to cells 97 and 98 such that, when shaft 79 is in its desired normal position, exactly the lower half of cell 97 is illuminated and exactly the upper half of cell 98 is illuminated. Thus, when cells 97 and 98 are connected in voltage bucking relation, no output voltage will be supplied therefrom. However, when shaft 79 moves downwardly an unbalanced voltage will be supplied at the output connections from cells 97 and 98. This is also true of pairs of cells 88 on diametrically opposite sides of rotor. The outputs of diametrically opposite pairs of cells 88 are connected in parallel as indicated in FIG. 7 where upper and lower cells 99 and 100 are shown diametrically opposite to cells 97 and 98.

Only two pairs of diametrically opposite photocells 88 are shown in FIG. 7 for the sake of simplicity. For this reason, only one pair of poles 95 are shown. Rotor 92 is provided with windings 93 therearound, whereby voltage produced by pairs of photocells 88 shown in FIG. 7 will cause rotation of rotor 92 in proportions to its axial displacement due to the fact that light emanating from lamp 89 will be intercepted by over half of one of the upper or lower photocells and less than half of the other photocells. Thus, the operation of the pairs of photocells 88 with permanent magnets 95 will be substantially the same as that of a direct current motor where commutation is provided by lamps 89 and pairs of photocells 88.

Still another embodiment of the invention is shown in FIG. 8 including an accelerometer housing 101, having upper and lower suspension means 102 and 103 connected to a control circuit 104. Shaft 105 has conical dielectric material 106 and 107 fixed to its upper and lower ends. Suspension means 102 includes a first electrode 108 fixed to housing 101 and a dielectric material 109 fixed to electrode 108. A frusto-conical electrode 110 is then fixed to housing 101 by means of dielectric rods 111. Electrodes 108 and 110 are then connected to control circuit 104. Similarly, suspension means 103 includes an electrode 112 having a dielectric disc 113 fixed thereto, and a frusto-conical electrode 114 fixed to housing 101 by means of dielectric rods 115.

Shaft 105 is rotated at an angular acceleration proportional to its axial displacement by an electric motor having a source of direct current power from a plurality of pairs of photocells 116 disposed around the circumference of a cylindrical member 117 having a plurality of vanes 118 defining a plurality of apertures 119. A light source is provided to illuminate photoelectric cells 116 including a fluorescent tube 120 which is arranged in a circular fashion around shaft 105 and maintained in a fixed position relative to housing 101 by any convenient means. Each of the photocells in a single pair 116 is connected in voltage bucking relation as in the embodiment of the invention shown in FIGS. 5, 6, and 7. Similarly, oppositely disposed pairs of photocells 116 are connected in parallel. The outputs of each oppositely disposed pair of photocells is connected to opposite ones of poles 121 of an electric motor stator 122 by means of a cable of wires indicated generally at 123. A permanent magnet electric motor rotor 124 is then provided upon which a torque is exerted by stator 122. A detector coil 125 detects the vertical movement of shaft 105 and movement of rotor 124 adjacent thereto in the same manner as detector coil 32 operates in connection with magnetic disc 34 of the embodiment of the invention shown in FIG. 1.

Supporting means 102 and 103 plus shaft 105 may be operated by the same means as shown in FIG. 2 except that electromagnets 11 and 12 will be replaced by supporting means 102 and 103. Thus, electrodes 112 and 114 are additionally biased by means of a battery 126 which is connected between them via a switch 127 and a resistor 128. Battery 126 serves the same biasing purpose as battery 27 embodied in control circuit 19 shown in FIG. 2.

Suspension means 102 and 103 with control circuit 104 operate in a manner directly analogous to the electromagnets 11 and 12 and control circuit 19 shown in FIG. 1. That is, should shaft 105 fall below a selected position relative to suspension means 102 and 103, the electric field linking dielectric cone 106 will be increased whereas the electric field linking dielectric cone 106 will be decreased, detection of movement of shaft 105 being made by coil 125 and movement of rotor 124 toward it. Since the electric field linking cone 106 will be increased and the electric field linking cone 107 will be decreased, control circuit 104 will, therefore, restore shaft 105 to its selected position between suspension means 102 and 103.

Shaft 105 is rotated at an angular acceleration proportional to its axial displacement as in the embodiments of the invention shown in FIGS. 1 and 5. This may be more easily understood when considered in connection with FIGS. 9 and 10. In FIG. 9, lamp 120 via aperture 119 illuminates only the lower half of an upper photoelectric cell 129 of a pair 116 and only the upper half of a lower photoelectric cell 130 of the same pair. Thus, when shaft 105 moves downwardly, photoelectric cell 129 will produce a greater input voltage than photocell 130 because more than half of it will be illuminated and less than half of photoelectric cell 130 will be illuminated. An output voltage will then be impressed on corresponding windings of diametrically opposite poles 121 to cause permanent magnet rotor 124 to rotate by reaction of the magnetic fields. It is to be noted that preferably vanes 118 and apertures 119 are both of widths equal that necessary to illuminate one half of each of one pair of photoelectric cells 116 at a time.

In FIG. 10, only two diametrically opposite pairs of photocells 116 are shown with only one pair of poles 121 and rotor 124. Only one pair of poles 121 has also been illustrated for clarity to show how the electric motor operates. It can be seen that cylinder 117 operates as a commutator having zero friction. The operation of the embodiment of the invention illustrated in FIG. 8 is thus directly analogous to the operation of the embodiment of the invention shown in FIG. 5, poles 121 being supplied with current when upper cells are illuminated at 10A more than lower cells at 10B or vice versa by movement of corresponding apertures 119.

The sensitivity, accuracy and reliability of the accelerometer of the invention is substantially enhanced by the use of "electronic springs" including either the electromagnets 11 and 12, electromagnets 76 and 77, or suspension means 102 and 103. As stated previously, the housings 10, 78 or 101 of the embodiments of the invention shown, respectively, in FIGS. 1, 5 and 8, may be evacuated if greater accuracy is desired.

In accordance with the invention, an unusually accurate integrator is also provided in which torque is exerted on an electronically suspended electric motor rotor in proportion to the output signal amplitude of an input signal to be integrated.

It is also an outstanding feature of the invention that the special kind of electric motor shown in FIGS. 1, 5 and 8 is employed in an integrator or an accelerometer adapted to perform a double integration of the acceleration which it detects. That is, the induction type electric motor shown in FIG. 1 does not physically contact shaft 13 of rotor 43, and therefore, the accuracy of the instrument as an integrator or accelerometer is substantially improved. Likewise, the elimination of any friction-type commutator in the embodiments of the invention shown in FIGS. 5 and 8 also means that contact friction drag for the particular types of direct-current electric motors shown in FIGS. 5 and 8 is eliminated.

It is to be noted that the invention is by no means limited to the specific embodiments shown and described. Although the invention is not limited to the following examples, certainly any of them may be employed without departing from the true scope of the invention. For example, two non-contacting movement detectors have been employed in the accelerometer and integrator of the invention. An inductive type is shown by the use of inductive coil 32 in FIG. 1 and inductive coil 125 in FIG. 8. A capacitive coupling may be employed including plates 81 and 82 in conjunction with metal disc 85 as shown in FIG. 5. It is to be noted further that suspension of shafts 13, 79 and 105 may be made either by a magnetic field or an electric field, magnetic field producing coils 12, 76 and 77 being indicated in FIGS. 1 and 5, and electric field producing means including supporting means 102 and 103 being indicated in FIG. 8. Still further, different types of electric motors may be employed as indicated in FIGS. 1, 5 and 8. It is to be noted that either the inductive or capacitive type of shaft position detectors may be employed in combination with either magnetic or electric field suspension means and with any one of the three electric motors shown in FIGS. 1, 5 and 8 and the invention still practiced.

Thus, the invention is not limited to any one of the several embodiments illustrated, since many changes and modifications will, of course, suggest themselves to those skilled in the art, the true scope of the invention being defined only in the appended claims.

What is claimed is:

1. An integrating accelerometer comprising: a proof mass including an electric motor rotor having dielectric ends; an electric field source of attraction for said rotor at opposite ends thereof to exert oppositely directed axial forces thereon; a control circuit including electronic means spaced from said rotor to produce an output signal proportional to its axial movement; means to increase the field strength of one of said sources when said rotor moves axially away from it and to simultaneously decrease the field strength of the other source to restore said rotor to a selected axial position spaced from both of said sources after it has moved therefrom; and means including an electric motor stator spaced from said rotor for imparting torque to said rotor in a plane substantially perpendicular to its axis and proportional to its axial displacement; and further means to measure angular displacement of said rotor.

2. An accelerometer for producing an output proportional to the integral of the acceleration it detects, said accelerometer comprising: a ferromagnetic electric motor rotor movable in an axial direction; two spaced coils at opposite ends of said rotor, said coils being positioned on a line extending in said predetermined direction; a control circuit including electronic means for detecting axial movement of said rotor for supplying current to said coils to restore said rotor to a predetermined axial position on movement of said rotor away from said predetermined axial position; means including an electric motor stator responsive to axial movement of said rotor in said axial direction for imparting torque to said rotor in a plane perpendicular to said axial direction and proportional to movement of said rotor in said axial direction; a set of black and white areas on said rotor around its circumference; a light source to direct light on said areas; a photoelectric cell to receive light emanating from said source and reflected from said areas; and a pulse counter responsive to the output of said photoelectric cell to produce an output signal proportional to the angular displacement of said rotor.

3. An accelerometer for producing an output proportional to the integral of the acceleration it detects, said accelerometer comprising: a ferromagnetic electric motor rotor movable in an axial direction; two spaced coils at opposite ends of said rotor, said coils being positioned on a line extending in said predetermined direction; a control circuit responsive to movement of said rotor in said axial direction for supplying current to said coils to restore said rotor to a predetermined axial position on movement of said rotor away from said predetermined axial position; two light sources on opposite sides of said rotor around its circumference; at least one pair of photoelectric cells disposed on opposite sides of said rotor, one of the photoelectric cells of each pair being disposed below the other to receive light emanating from said sources as said rotor is rotated; a winding around said rotor; means electrically connecting each of the photoelectric cells in each of said pairs in voltage bucking relationship; means connecting said pairs in parallel and to said winding on said rotor; and means for imparting torque to said rotor in a plane perpendicular to said axial direction proportional to the output of said photoelectric cells including an electric motor stator for producing a unidirectional magnetic field in linking relation with said rotor winding.

4. An accelerometer for producing an output proportional to the integral of the acceleration it detects, said accelerometer comprising: a ferromagnetic electric motor rotor movable in an axial direction; two spaced coils at opposite ends of said rotor, said coils being positioned on a line extending in said predetermined direction; a control circuit responsive to movement of said rotor in said axial direction for supplying current to said coils to restore said rotor to a predetermined axial position on movement of said rotor away from said predetermined axial position; a pair of photoelectric cells disposed on opposite sides of said rotor in a fixed position, one photoelectric cell of each of said pairs being disposed below the other; a light source to illuminate said photoelectric cells; a plurality of vanes fixed to said rotor to intercept light emanating from said source; and means including an electric motor stator having a winding connected to said photoelectric cells for imparting torque to said rotor in a plane perpendicular to said axial direction and proportional to the output of said photoelectric cells, the photoelectric cells of each of said pairs being connected in voltage bucking relationship and said pairs of cells being connected in parallel.

5. An integrating accelerometer comprising: a proof mass including the rotor of an electric motor; field sources of attraction for supporting said rotor at opposite ends thereof and spaced therefrom to exert oppositely directed axial forces thereon; a control circuit including reactive electronic means spaced from said rotor to produce an output signal proportional to its axial movement; means responsive to said output signal to change the field strengths of said sources of attraction to restore said rotor to a selected axial position spaced from both of said sources after it has moved therefrom; means including a commutatorless electric motor stator spaced from said rotor and from said field sources for imparting torque to said rotor in a plane substantially perpendicular to its axis and proportional to its axial displacement; and further means to measure angular displacement of said rotor.

6. An integrating accelerometer comprising: a proof mass including a ferro-magnetic rotor of an electric motor, magnetic field sources of attraction for supporting said rotor at opposite ends thereof and spaced therefrom to exert oppositely directed axial forces thereon; a control circuit including reactive electronic means spaced from said rotor to produce an output signal proportional to its axial movement; means to increase the field strength of one of said sources when said rotor moves axially away from it and to simultaneously decrease the field strength of the other field source to restore said rotor to a selected axial position spaced from both of said source after it has moved therefrom; means including an electric motor stator spaced from said rotor and from said field sources for imparting torque to said rotor in a plane substantially perpendicular to its axis and proportional to its axial displacement; and further means to measure angular displacement of said rotor.

7. An integrating accelerometer comprising: a proof mass including a completely isolated electric motor rotor having axial symmetry; field sources of atttraction for supporting said rotor at opposite ends thereof and spaced therefrom to exert oppositely directed axial forces thereon; a control circuit including reactive electronic means spaced from said rotor to produce an output signal proportional to its axial movement; means responsive to said output signal to change the field strength of said sources of attraction to restore said rotor to a selected axial position spaced from both of said sources after it has moved therefrom; means including an electric motor stator spaced from said rotor and from said field sources for imparting torque to said rotor in a plane substantially perpendicular to its axis and proportional to its axial displacement; and further means to measure angular displacement of said rotor.

8. An integrating accelerometer comprising: a proof mass including a completely isolated induction motor rotor having axial symmetry; field sources of attraction for supporting said rotor at opposite ends thereof and spaced therefrom to exert oppositely directed axial forces thereon; a control circuit including reactive electronic means spaced from said rotor to produce an output signal proportional to its axial movement; means responsive to said output signal to change the field strength of said sources of attraction to restore said rotor to a selected axial position spaced from both of said sources after it has moved therefrom; means including an induction motor stator spaced from said rotor and from said field sources for imparting torque to said rotor in a plane substantially perpendicular to its axis and proportional to its axial displacement; and further means to measure angular displacement of said rotor.

9. An integrating accelerometer comprising: a proof mass including a ferromagnetic rotor of an induction motor; magnetic field sources of attraction for supporting said rotor at opposite ends thereof and spaced therefrom to exert oppositely directed axial forces thereon; a control circuit including reactive electronic means spaced from said rotor to produce an output signal proportional to its axial movement; means to increase the field strength of one of said sources when said rotor moves axially away from it and to simultaneously decrease the field strength of the other field source to restore said rotor to a selected axial position spaced from both of said sources after it has moved therefrom; means including an induction motor stator spaced from said rotor and from said field sources for imparting torque to said rotor in a plane substantially perpendicular to its axis and proportional to its axial displacement; and further means to measure angular displacement of said rotor.

10. An accelerometer for producing an output proportional to the integral of the acceleration it detects, said accelerometer comprising: a ferromagnetic proof mass movable in a predetermined direction; two spaced proof mass support coils at opposite ends of said proof mass, said coils being positioned from said proof mass on a line extending in said predetermined direction; a control circuit responsive to movement of said mass in said predetermined direction for supplying current to said coils to restore said mass to a predetermined position in spaced relation between said magnetic coils upon movement of said mass away from said predetermined position; means responsive to movement of said mass in said predetermined direction for imparting torque to said mass in a plane perpendicular to said predetermined direction and proportional to movement of said mass in said predetermined direction; and further means to measure angular displacement of said mass.

11. An accelerometer for producing an output proportional to the integral of the acceleration it detects, said accelerometer comprising: a ferromagnetic electric induction motor rotor movable in an axial direction; two spaced rotor support coils at opposite ends of said rotor, said coils being positioned from said rotor on a line extending in said predetermined direction; a control circuit responsive to movement of said rotor in said axial direction for supplying current to said coils to restore said rotor to a predetermined axial position on movement of said rotor away from said predetermined axial position; means including an electric motor stator surrounding said rotor responsive to movement of said rotor in said axial direction for imparting torque to said motor in a plane perpendicular to said axial direction and proportional to movement of said rotor in said axial direction; and further means to measure angular displacement of said rotor.

12. An accelerometer for producing an output proportional to the integral of the acceleration it detects, said accelerometer comprising: a ferromagnetic electric induction motor rotor movable in an axial direction; two spaced rotor support coils at opposite ends of said rotor, said coils being positioned from said rotor on a line extending in said predetermined direction; a control circuit responsive to movement of said rotor in said axial direction for supplying current to said coils to restore said rotor to a predetermined axial position on movement of said rotor away from said predetermined axial position; torque means including an electric motor stator having two sets of windings arranged to produce two magnetic fields at different axial positions through said rotor of the same amplitude and rotating at the same speed but in opposite directions, said torque means being responsive to movement of said rotor in said axial direction for imparting torque to said rotor in a plane perpendicular to said axial direction and proportional to movement of said rotor in said axial direction; and further means to measure angular displacement of said rotor.

13. An integrating accelerometer comprising: an electric motor including a rotor to serve as a proof mass; support means at each end of said rotor for producing a field of attraction for said rotor to exert oppositely directed axial forces thereon; means to produce an output signal proportional to axial movement of said rotor toward and away from said field-producing means; means for energizing said field-producing means in accordance with said output signal to maintain said rotor in a substantially fixed axial position spaced from said field-producing means; means for exerting torque upon said rotor in accordance with its axial displacement; and further means to measure angular displacement of said rotor.

14. An integrating accelerometer comprising: a proof mass including the rotor of an electric motor; field sources of attraction for supporting said rotor at opposite ends thereof and spaced therefrom to exert oppositely directed axial forces thereon; a control circuit including reactive electronic means spaced from said rotor to produce an output signal proportional to its axial movement; means responsive to said signal to change the field strengths of said sources of attraction to restore said rotor to a selected axial position spaced from both of said sources after it has moved therefrom; means including a commutatorless electric motor stator spaced from said rotor for imparting torque to said rotor in a plane substantially perpendicular to its axis and in accordance with its axial displacement; and further means to measure angular displacement of said rotor.

15. An accelerometer for producing an output proportional to an integral of the acceleration it detects, said accelerometer comprising: a ferromagnetic proof mass movable in a predetermined direction; two spaced coils supporting said proof mass and separate therefrom; a control circuit responsive to movement of said mass in said predetermined direction for supplying current to said coils to restore said mass to a predetermined position in spaced relation between said magnetic coils upon movement of said mass away from said predetermined position; means responsive to movement of said mass in said predetermined direction for imparting torque to said mass in a plane perpendicular to said predetermined direction and in accordance with movement of said mass in said predetermined direction; and means to measure the angular displacement of said mass.

References Cited in the file of this patent
UNITED STATES PATENTS

| | | |
|---|---|---|
| 1,840,001 | Tsujita | Jan. 5, 1932 |
| 2,384,348 | Schweitzer | Sept. 4, 1945 |
| 2,583,202 | Benson | Jan. 22, 1952 |
| 2,695,165 | Hansen | Nov. 23, 1954 |
| 2,733,857 | Beams | Feb. 7, 1956 |
| 2,805,373 | Bonnell | Sept. 3, 1957 |
| 2,805,375 | Morgan | Sept. 3, 1957 |
| 2,819,053 | Pope | Jan. 7, 1958 |
| 2,856,238 | Dacus | Oct. 14, 1958 |
| 2,882,034 | Wuerth | Apr. 14, 1959 |